United States Patent [19]

Rao

[11] Patent Number: 4,604,988
[45] Date of Patent: Aug. 12, 1986

[54] LIQUID VORTEX GAS CONTACTOR

[75] Inventor: Dandina N. Rao, Calgary, Canada

[73] Assignee: Budra Research Ltd., Calgary, Canada

[21] Appl. No.: 591,041

[22] Filed: Mar. 19, 1984

[51] Int. Cl.⁴ .............................................. F24H 1/20
[52] U.S. Cl. .............................. 126/360 A; 122/5.5 A; 122/31 A; 431/4; 261/112
[58] Field of Search ............... 122/31 R, 31 A, 5.5 A; 126/360 A; 166/59; 431/4, 158; 261/112

[56] References Cited

U.S. PATENT DOCUMENTS

| 1,806,378 | 5/1931 | Witzler et al. | 126/355 |
| 2,545,028 | 3/1951 | Haldeman | 261/15 |
| 4,308,038 | 12/1981 | Michel | 261/112 |
| 4,366,860 | 1/1983 | Donaldson et al. | 431/158 |
| 4,385,661 | 5/1983 | Fox | 431/158 |
| 4,411,618 | 10/1983 | Donaldson et al. | 431/190 |

FOREIGN PATENT DOCUMENTS

| 1002632 | 3/1952 | France | 122/5.5 A |
| 406100 | 10/1943 | Italy | 122/5.5 A |

Primary Examiner—Carroll B. Dority, Jr.
Attorney, Agent, or Firm—David J. French

[57] ABSTRACT

A method and apparatus for contacting a flow of gas with a flow of liquid is provided. The liquid is introduced into a vortex sustaining container and flows through the container in a spiralling manner creating a liquid vortex with an open axial core. Gas flows to be contacted with the liquid flow are introduced into the core. The vortex core geometry may be adapted to accommodate insertion of a flame to effect heat transfer. The degree of contact between the gas and liquid flows may be increased by adding an extended contact zone following the region where the vortex flow breaks down and mixing of the liquid and gas flows occurs. By creating annular misting in the extended contact zone, the rate of any chemical, physical or mass transfer process between the two flows may be increased.

29 Claims, 15 Drawing Figures

LIQUID VORTEX GAS CONTACTOR

FIELD OF INVENTION

This invention relates to a methed and apparatus for contacting a stream of flowing gas and a stream of flowing liquid. This invention also relates to an apparatus and method by which streams of gas and liquid may be introduced into a contact zone in a controlled manner in order to facilitate physical or chemical reactions between the two flows. More particularly, this invention relates to the containment of a flame within a partially surrounding continuous surface of flowing liquid, and to means by which heat from the products of combustion may be transferred to a liquid.

BACKGROUND OF THE INVENTION

It is often desirable to bring together a stream of gas with a stream of liquid in order that a chemical or physical reaction or mass transfer may take place between the two streams. One particular example of such a condition is the contacting of the products of combustion arising from a flame with a liquid in order to transfer heat to the liquid. Other examples include the contacting of a cooling refrigerant gas with a liquid in order to cool the liquid or the absorption of carbon dioxide or hydrogen sulfide from acid gas by contacting with ethanolamines or gylcols.

When gases and liquids are to be contacted in order to precipitate a chemical or physical reaction, the rate at which the process proceeds depends upon the surface area over which such contacting occurs. In such cases, in order to obtain high rates it is desirable to maximize this contact surface area.

Direct contact heat transfer (DCHT) is the technique by which heating and heated materials are brought into intimate contact with each other without the presence of an intermediate heat transfer surface or barrier. One example of DCHT is in the heating of fluids, primarily water, by the direct contacting of the products of combustion with the liquid. Steam can be raised by spraying water into a stream of hot gases issuing from a burner. Alternatively, hot gas streams generated by combustion can be bubbled through a liquid using submerged combustion heaters to effect heat transfer. Maximization of contact surface area is a desirable objective in each of these cases.

In the case of submerged combustion heaters, the flame or combustion zone is separated from the fluid by a protective tube or cylinder which acts as a shroud or shield. Such shielding elements are often susceptible to severe scaling and corrosion. Similar problems are typical in the case of downhole steam generators for use in injecting heated water or steam into oil-bearing underground formations. The annular metallic sleeves which surround the flame and transport water to the exhaust gas zone in downhole or surface heaters suffer particularly from scaling problems.

When a flame is contained within a protective shroud the shroud may on occasion be raised to very high temperatures. Where cooling is not provided the shroud may become glowing hot or even white hot. Where metals are used in such circumstances, cooling is provided to limit rapid deterioration of the metal in the shroud. When cooling, usually in the form of circulating water, is applied to the exterior surface of the flame shroud, steep thermal gradients are formed within the shroud wall. This can lead to metal fatigue and failure of the mechanical integrity of the shroud wall.

The same corrosion and fatigue problems arise when unquenched combustion exhaust gases are introduced into contact columns where direct contact cooling occurs. To protect trays and other contact surfaces within such columns, it is often necessary to pre-cool combustion gases.

OBJECTS OF THE INVENTION

The objects of the invention therefore include the following:

(1) to provide apparatus for contacting a gas, which may be the product of combustion, with a liquid in a controlled manner;

(2) to eliminate the problem of deterioration of flame shrouds due to exposure to high temperatures;

(3) to increase the efficiency of heat transfer between a flame or a hot gas and a liquid;

(4) to provide a liquid heating system which can rapidly adapt to changes in heating demand; and (5) to provide a continuous gas-liquid contactor which exhibits relatively reduced pressure drops for the liquid and gas streams.

SUMMARY OF THE INVENTION

According to a broad aspect of the invention a stream of gas is passed through the liquid-free axial core of a continuously flowing hydrocyclone liquid vortex exhibiting reversing flow to directly contact the liquid.

By another aspect of the invention heat is transferred between a gas flow passed through the liquid-free core of a continuously flowing hydrocyclone liquid vortex exhibiting reversing flow and that liquid.

By another aspect of the invention a flame is maintained within the liquid-free core of a continuously flowing liquid vortex.

By another aspect of the invention where the invention is applied to the heating of a liquid by means of combustion, a flame is introduced into the liquid-free axial core of a continuously flowing liquid vortex in a region where the parameters governing the geometry of the vortex and its core have been adjusted to accommodate the stable burning of a high intensity flame within that core.

By another aspect of the invention the degree of contact between gas and liquid flows is enhanced after such fluids have been brought together through a vortex core by selecting their respective velocities so that a portion of the liquid is entrained in the gas in the form of small droplets which form a mist.

By another aspect of the invention the flame compatible geometry of a continuously flowing liquid vortex and its core is maintained along the entire length of the combustion zone of the flame and then the geometry of the vortex container is adjusted beyond the combustion zone in the direction of concurrent flow of both the exhaust gases and the liquid constituting the vortex to create annular misting.

An open core spiral of circulating liquid is created by the direct tangential injection of liquid at a slight axially biased inclination along the inner surface of a containing wall of circular cross-section. Liquid flow in such a case tends to spiral along the inner surface of the container, creating for at least an initial region, an interior film of circulating and migrating liquid within the container. Such a region can be used for the contacting of a stream of gas flowing through the vortex core with the surface of the liquid within the core. In particular this region can be used for the containment of a flame upon selection of suitable geometries for both the flame and liquid film. However, the liquid flow in such a configuration may be subject to turbulence and/or variations in the thickness of the liquid film.

It has been known in the art of separating solid particles from liquids to create an open-core spiraling vortex of continuously flowing liquid in the form of a hydrocyclone having 'reflexive' or 'reversing' flow. The expressions 'reflexive flow' or 'reversing flow' refer to a structure in which a liquid is injected tangentially into a container of circular cross-section (which may be either conical or cylindrical) to form an open core vortex. The liquid first spirals towards one end of the container until it either enters or is substantially influenced by a conically narrowing region. The flow then is displaced inwardly and reverses direction. This inner reverse direction flow then spirals back towards and past the original inlet, separated from the container wall by the flow which is migrating in the opposite direction. Such devices are known in the art as "hydrocyclones".

Hydrocyclones based on reflexive flow have the advantage of being capable of operating in highly stable modes. When mounted vertically with the conic reflector at the bottom, particulate laiden liquid can be extracted at the bottom by an outlet permitting "underflow"; and particulate reduced liquid can exit from the system at the top through an "overflow" outlet.

It has been found as set forth herein that a hydrocyclone exhibiting reflexive flow is especially suitable for containment of a flame since in the region where dual counter-current flows exist, the recently injected, relatively cooler liquid is flowing adjacent to the outside wall of the container. Furthermore, the core surface and thickness of the migrating interior layer of liquid is highly stable, exhibiting minimal irregularities.

In a hydrocyclone the overflow outlet may be constructed in the form of a cylindrical tube which is mounted co-axially with the container wall at the end opposite the conic apex. By choosing the appropriate diameter for this cylindrical outlet a highly stable and regular spiralling vortex of exiting liquid can be obtained for a distance before the spiralling flow breaks down. By selecting the rate of liquid flow, the diameter of the container, the overflow outlet and the velocity of injection of the liquid, the combined lengths wherein the inner core exhibits a stable surface may be arranged to be of sufficient diameter and length to accommodate a burner flame therein.

The conic section need not, in fact, be closed to its apex. Where no underflow is desired, the conic section may have an axially aligned hole of a diameter up to the diameter of the liquid-free core of the liquid vortex. Both the diameter of the liquid core and this aperture can be made sufficiently large to accept the injection of a gas flow or accommodate a burner nozzle and permit maintenance of a stable flame within the vortex core.

The conic end need not be perfectly conic in shape. Essentially this part serves to displace the circulating vortex flow inwardly and reverse its direction of flow. Any end part that is angled inwardly around its circumference sufficiently to displace and reflect this flow may be utilized. This may include a part that is generally hemispheric in shape or a flat end plate.

When a flame has been established within the core of a continuously flowing liquid vortex, heat may be transferred directly to the surrounding liquid from the hot gases of the flame by radiation and by convection.

To compliment the direct contact heat transfer process initiated in the combustion zone, an extended contact zone to effect heat transfer may be added to the system. This latter zone should occur immediately adjacent the combustion zone where it can receive and permit contact between the hot products of combustion and the liquid issuing from the combustion zone. Such an extended zone may also usefully be adopted when the invention is to be applied to effecting physical or chemical reactions or mass transfer between gas and liquid flows.

Various types of extended heat transfer zones may be adopted for use with a hydrocyclone enclosed flame. These include those in which the liquid is disbursed over surfaces placed in the heat transfer zone, thus serving to increase the area of liquid exposed to the gas. Another preferred alternative is to create a region of two phase flow in which either the gas is entrained in the liquid as bubbles or the liquid is entrained in the gas as droplets.

The latter configuration is preferable where a higher increase in liquid temperature is required. This is because the ratio of liquid to gas mass can be kept lower when the liquid is entrained in the gas. A preferred form of heat transfer zone is one in which an annular mist flow pattern occurs of the type described by Hewitt and Hall-Taylor in "Annular Two-Phase Flow" Pergamon Press N.Y. (1970) or Taitel and Dukler, A.I.Ch.E. Journal 22, Nol, p47, 1976. In order to effect such condition, the superficial gas and liquid velocities in this zone must be within certain critical ranges. Given predetermined gas and liquid delivery rates, the superficial gas and liquid velocities in the heat transfer zone can be controlled by adjusting the diameter of the passage through which these components are being forced to flow. This dimension can be adjusted to provide the annular misting conditions specified in the text by Hewitt and Hall-Taylor as cited.

A separator section may optionally be added following the heat transfer zone where the separation of exiting components is both necessary and desired. Any suitable conventional separator means may be adopted. This may include a simple settling chamber, or it may include a more complex separator which provides a matrix to enhance or accelerate the separation process of any known type.

The combined system or the vortex zone alone may be operated under pressurized conditions. Such conditions can permit higher combustion intensities, larger flame stability limits, higher liquid temperatures prior to boiling occurring, and may facilitate chemical reactions which perform well under higher pressure conditions.

The hydrocyclone structure described herein as providing a heat transfer zone may also be independently adapted to other uses. Examples include the cooling of a liquid by contacting it with a refrigerant gas; the absorption of carbon dioxide or hydrogen sulphide from acid gas by contacting with a flow of ethanolamines or glycols; the absorption of ammonia in water from ammonia-air mixtures; evaporation and concentration of chemical solutions including solidification of dissolved components from chemical solutions such as in prilling concentrated urea solutions; and steam stripping of organics from low and high viscosity solutions. In the case where hard water is being heated, carbon dioxide may be introduced into the water flow either from the products of combustion or by ancillary injection to reduce precipitation of calcium carbonate.

Essentially the interior of the vortex core provides a contact zone wherein physical or chemical reactions may take place between a gas and a liquid. This is a novel concept in itself where a hydrocyclone is employed. It is also novel to generate a flame within a liquid vortex. An extended contact zone may also be provided in the region immediately adjacent and beyond where the circular motion of the liquid starts to break down and the gas and liquid become intermixed. While simultaneously delivering liquid to the extended contact zone, the liquid-free axial core of the vortex provides an aperture for introducing gases concurrently into the same zone at controlled rates.

Where annular misting is created within this latter zone, the large surface area of droplets entrained in the gas will favour higher reaction, heat and/or mass transfer rates between the two fluids. The delivery of liquid into such a zone directly from the outlet of a hydrocyclone or continuously flowing liquid vortex assists the development of an annular misting condition.

BRIEF DESCRIPTION OF THE DRAWINGS

To permit better understanding of the invention, a Preferred embodiment will now be described in detail in conjunction with the attached drawings in which:

FIG. 6 shows the increase in temperature of water output after the sytem is turned on;

DESCRIPTION OF THE PREFERRED EMBODIMENT

Figure 1:
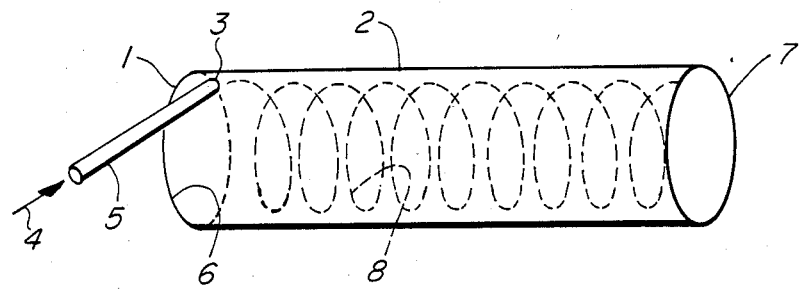
FIG. 1 shows the structure of a basic liquid vortex container

The structure of a basic container for supporting a liquid vortex of the type contemplated by the invention is shown in FIG. 1 in schematic form. A cylindrically walled open ended container 1 has mounted on its outside surface 2 an injection inlet 3 to which water 4 is supplied through a tube 5. The tube 5 is so angled as to inject the water 4 substantially tangentially along the inner surface 6 of the container 1 with a slight angular bias towards the exit end. This angle of bias may be varied to ensure that the interior surface 6 is covered by a liquid layer and adjust flow rate within the container 1. Due to its high injection momentum the water 4 flows along the inner surface 6 of the container 1 leaving an open core. A number of tangential entries can be provided along the length of the container 1 to extend the length of the vortex and its open core as required.

The water flow path 8 follows a spiral course, disposing circulating liquid over the inner surface 6 of the container for a distance along its length. This flow eventually exits at the end 7. Gas which is to be contacted with the inner surface of this liquid flow may be passed through the open core.

In the preferred embodiment four separate stages were constructed: (1) the hydrocyclone; (2) the gas burner; (3) the two phase contact zone and (4) the separator. These were mounted for horizontal flow rather than vertically, as is customarily done with separation hydrocyclones.

Figure 2:
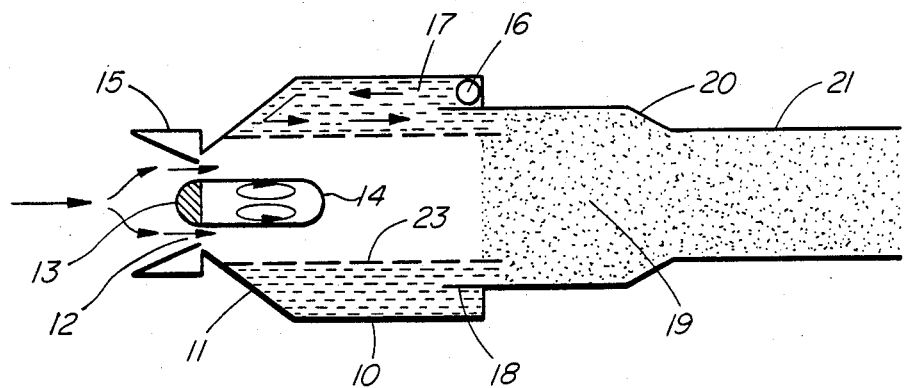
FIG. 2 is a schematic drawing of the zones of operation of a burner flame within a hydrocyclone with an extended contact zone.

A schematic drawing of the zones associated with the operation of the first three stages is shown in FIG. 2 as follows:

(i) Combustion zone within the hydrocyclone where the combustion of the premixed fuel/air stream takes place, (ii) Heat transfer zone within the hydrocyclone wherein the hot gases transfer their heat to the water stream primarily by radiation and partially by convection, and (iii) Spray quench zone within the two phase region where most of the water is entrained as droplets in the gas stream and the heat transfer takes place mostly by convection.

The variables controlling the overall performance of the system include: (a) air flow rate, (b) equivalence ratio, (c) inlet air-gas mixture temperature, (d) water flow rate, and (e) inlet water temperature.

In FIG. 2 the cylindrical outer wall 10 of hydrocyclone container abuts the conic end 11. An aperture 12 of diameter "d" is formed in the conic end 11 and a half cylinder bluff body 13 which serves to hold the flame 14 is mounted in the aperture 12. An encircling flame retention cup 15 is mounted adjacent the aperture 12 and serves to contain low velocity air-gas flow.

Water enters the hydrocyclone at the injection inlet or port 16. One of three such ports of varying diameters provided evenly spaced around the circumference of the outer wall 10 was utilized at any given time to test changes in performance with the diameter of the port 16. The port 16 injects water 17 tangentially along the inner surface of the wall 10 forming a vortex. The water 17 flows initially towards the conic end 11 and then is reflected inwards and backwards towards and then along the inner surface of the outlet tube 18.

Once the water 17 has proceeded for a distance down the outlet pipe 18 it loses its circulating flow and the vortex breaks down. The exhaust gases from the flame 14 then mix with the water 17 and a mist 19 commences to form. To ensure that a condition of annular misting exists the outlet tube 18 narrows at a neck 20 to a smaller diameter two-phase flow tube 21.

Figure 3:
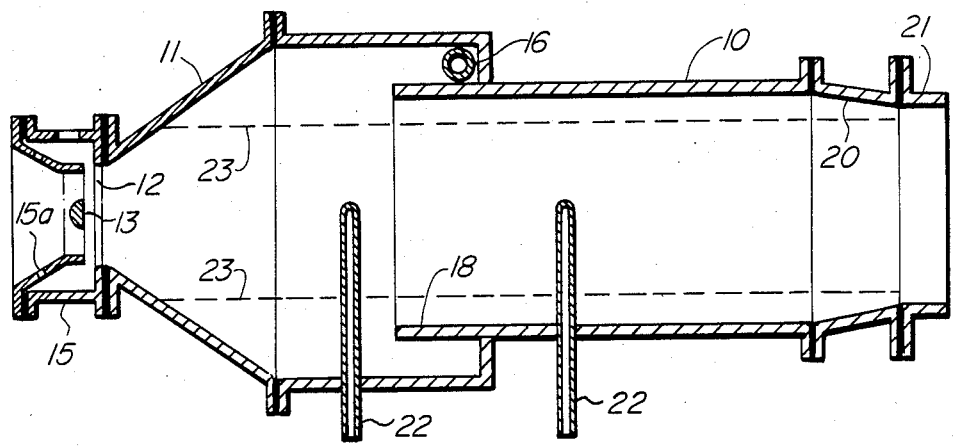
FIG. 3 shows the structure of the hydrocyclone container.

FIG. 3 shows the actual physical structure of the hydrocyclone as constructed with corresponding parts numbered as in FIG. 2. Additional features shown in FIG. 3 include temperature sensing probes 22, and the approximate locus 23 of the inner surface of the water vortex.

Figure 4:
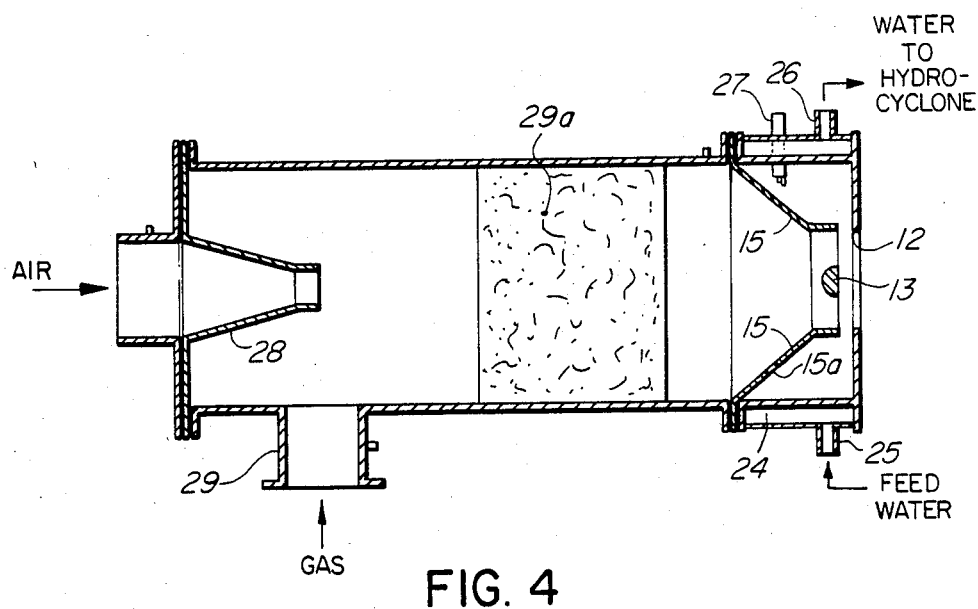
FIG. 4 shows details of the burner.

Details of the burner are shown in FIG. 4. Small auxiliary ports 15a are formed through the inner wall of the flame retention cup 15 to permit a low velocity flow of unburned air-gas mixture to enter the cup 15. Surrounding the flame retention cup 15 is a water chamber 24 which cools the metal of the cup 15. An inlet 25 to this chamber 24 allows water to flow through it to exit at an outlet 26 from whence the water proceeds to be injected into the hydrocyclone. A spark igniter 27 passes through the water chamber 24 into the flame retention cup 15.

Air enters the burner through an air inlet 28 and a gaseous fuel through a gas inlet 29. A steel wool pad 29a serves to provide a mixing region for the air and gas.

The system can be operated with any type of gaseous or liquid fuel which will form a flame in the vortex core. Examples include hydrogen, natural gas, propane and various fuel oils or coal-oil slurries. The burner can be operated with enriched air or oxygen. In all such cases the burner should be adapted to the nature of the fuel being supplied. Where the system is operated under pressurized conditions the combustible mixture delivery system should also be appropriately pressurized.

Figure 5:
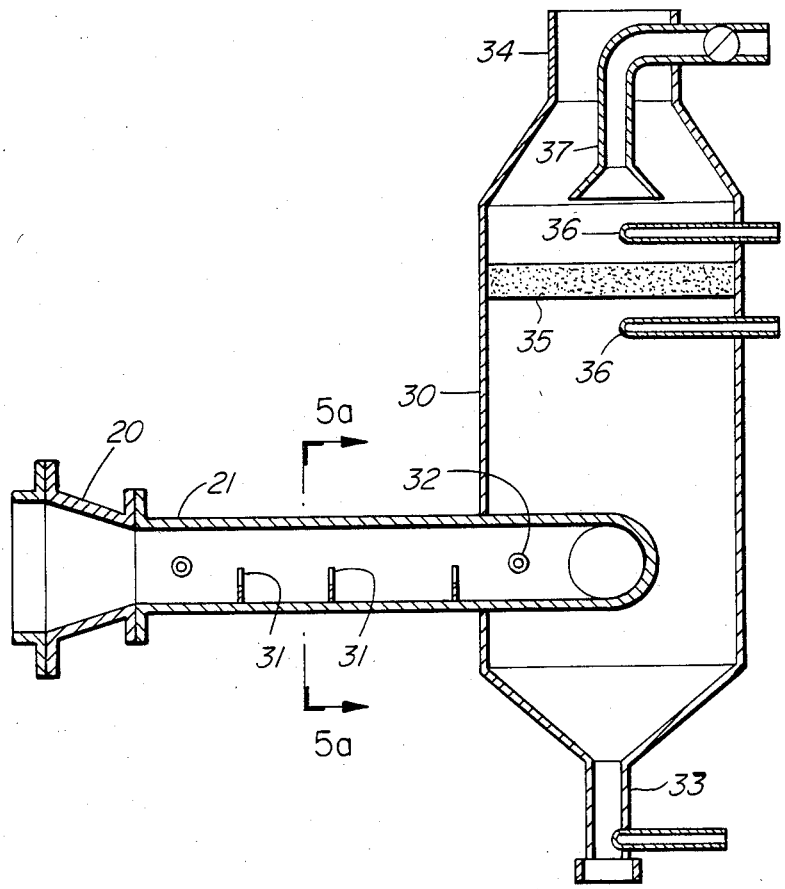
FIG. 5 shows the two-phase flow section and separator.
Figure 5A:
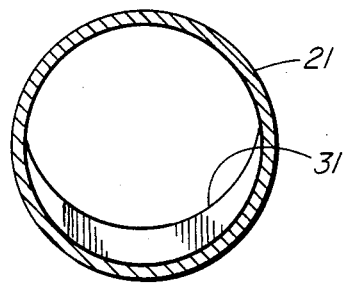

Details of the two phase flow section and separator are shown in FIG. 5. The two-phase flow tube 21 is of extended length beginning at the reducing neck 20 and terminating within the separator body 30. A series of four baffles 31 of crescent shape are mounted transversely along the bottom of the flow tube 21. These baffles 31 serve to break up the liquid film and increase mixing with the gas stream. The tube 21 is mounted approximately horizontally, with a slight upward tilt (1.2°) in the direction of fluid flow in order to enhance annular misting. Holes 32 for permitting insertion of thermocouples are also indicated.

The water-gas two phase mixture in the flow tube 21 passes into the separator body tangentially upon exiting the flow tube 21. The water flows out through a bottom drain 33 and the gas through a top vent 34. A demister pad 35 extends across the interior of the separator body 30 to minimize water entrainment in the exhaust gas. Other thermocouples 36 and a gas sampling tube 37 extend into the interior of the separator body 30 to monitor conditions. While the drawings in the figures are not to scale, the dimentions for various portions are indicated thereon. The entire structure was either machined or assembled using welding or brazing from steel. The burner and hydrocyclone were made from stainless steel. For commercial use, other suitable materials may be used.

General Characteristics of a Hydrocyclone

The rotation of the fluid creates the low pressure axial core which in the case of hydrocyclones results in a free liquid surface. If the cyclone is communicating with the atmosphere at either one outlet or the other or both, the core be comes air filled. The core can exist even when there is no communication with the surrounding atmosphere. In this case the core is filled with vapor and dissolved gases in the liquid. Another important characteristic feature of this air core in hydrocyclones in that it is generally of constant diameter throughout the cyclone length. This is more precisely true when the hydrocyclone is mounted horizontally. Some of the results of a number of experimental or theoretical investigations appearing in the literature have suggested that 1. The diameter of the core increases with increase in flow rate up to a certain point beyond which further increases in flow rate have no apparent effect. —Bradley, "The Hydrocyclone" Pergamon Press N.Y. 1965.

2. The core diameter increases with increase in overflow diameter but remains unaffected by changes in underflow diameter. Fontein, Van Kooy, and Leniger "The Influence of Some Variables Upon Hydrocyclone Performance" British Chemical Engineering, 7, p410, 1962.

3. The core diameter increases with increase in cone angle. Bradley, Supra.

4. The core diameter for hydrocyclone separators varies between $0.06D_c$ and $0.42D_c$ where $D_c$ is the diameter of the cylindrical portion of the hydrocyclone. Tarjan G "Discussion of Paper by E. D. Lilge" Trans Inst of Min and Metal, 71, P539, 1962.

Criteria for the Design of the Hydrocyclone

The following discussion and formulae are not intended to be precise, but are intended to be useful to aid in the design of hydrocyclones suitable for use in the invention.

The conditions for equilibrium and for stability of a rotating flow in a hydrocyclone may be obtained from "Flow Patterns in a Cylindrical Hydrocyclone Measured with a Laser-Doppler Velocity Probe" by D. I. Exall, CSIR Report CENG 062, Pretoria S.A., Dec. 1974.

A condition for vortex stability is that the centrifugal acceleration at the periphery of the cyclone should be greater than the acceleration due to gravity. From this an approximate condition for core stability can be derived. Making use of the empirical equation ($Vr^n$=constant) for tangential velocity accepted widely in industry, this condition can be shown to be:

$$V_i > (0.27 \, g^{0.5} R_c^{1.5})/R_i$$

$V_i$=average velocity of water in the inlet pipe
g=acceleration due to gravity
$R_c$=radius of cylindrical portion of cyclone
$R_i$=radius of inlet pipe Therefore the critical water inlet velocity required to obtain a stable core is a function of inlet pipe radius and cyclone radius. In actual operation care should be taken to keep the feed velocity above this critical value (calculated from equation for $V_i$) in order to ensure vortex stability.

An equation for the water stream pressure drop which is applicable to cyclones of any size may be obtained in the reference of Bradley cited above.

The major design variables for the hydrocyclone are the cyclone diameter ($D_c$), inlet diameter ($D_i$), over flow diameter ($D_o$), under flow diameter ($D_u$), length of the cylindrical section, and the cone angle. The important operating variables are the feed flow rate, the pressure drop, Reynolds number, critical water inlet velocity, and the centrifugal acceleration. All of these criteria for this application may determined by reference to the existing literature applicable to hydrocyclone design and the PhD Thesis of Dandina Nagaraja Rao entitled "Development of a Novel Direct Contact Heat Transfer System for Carrying out Combustion in a Flowing Stream of Water", University of Calgary, Alberta, Canada.

The critical water flow rate is proportional to $D_i$ and $D_c^{1.5}$ and is independent of the cone angle and the over flow diameter ($D_o$). For a 10% increase in $D_c$, nearly 50% increase in capacity results for all inlet diameters. This indicates that a smaller diameter cyclone is to be preferred where it is desired to avoid requiring a very high duty burner. Also, a smaller cyclone diameter will have less pressure drop.

A diameter of 78 mm was chosen for the demonstration hydrocyclone which permitted a design water flow rate of 1300 kg/h to be achieved.

The water inlet diameter is one of the most important dimensions as it affects many of the operating variables. The inlet diameter affects the critical water velocity, critical water flow rate, and the rate of injection of momentum ($R_m$) at constant flow rate. Increases in the rate of injection of momentum is a clear indication of vortex stability and hence the stablility of the air-core. Thus to provide vortex stability smaller inlet diameters are to be preferred. For the 78 mm diameter hydrocyclone body chosen it was found that an inlet diameter of 13 mm or less would provide such stability.

In order to obtain a constant $R_m$ with different inlets of increasing diameters the water flow rate has to be increased considerably. This increases the cyclone capacity thereby increasing the heat demand on the burner. However, the velocity loss ratio decreases with $D_i$. This means that the peripheral velocity decreases as $D_i$ decreases for a constant $D_c$. Upon analysis it has been found that smaller $D_i$ values are to be preferred.

It was therefore decided to provide three different inlets (4.6 mm, 7.7 mm and 10.9 mm in diameter). For these inlet diameters the ratios of $D_c/D_i$ are 17, 10, and 8 respectively while normally adopted ratio of $D_c/D_i$ varies from 3 to 7 in hydrocyclone design.

The overflow diameter affects the pressure drop in the vortex flow. The pressure drop, being inversely proportional to $D_o$, decreases with increasing $D_o$. The air-core diameter is known to increase with increase in overflow diameter. For these reasons large overflow diameters are preferred. However, a limit imposed on the maximum size of overflow may be that the tangential jet of water issuing from the inlet should not impinge on the outer walls of the overflow outlet. Otherwise the resulting decrease in the tangential velocity may destroy the vortex stability and the air-core.

The maximum value of $D_o$ reported in the literature is about 0.60 $D_c$, generally used values being much lower than 0.60 $D_c$. This limitation in hydrocyclones arises from the requirement of controlling the split between overflow and underflow. However, where the design criterion is that there should be no underflow at all, this limitation of $D_o=0.60\ D_c$ can be surpassed. Therefore it was decided that a value of $D_o$ equal to 0.78 $D_c$ be used. It is also possible to set $D_o=D_c$ if care is taken to ensure that the injected flow does not disrupt vortex flow at the core.

TABLE 4.1

| $D_o$ mm | $D_u$ mm | $D_{ao}$ mm | $D_{ao}/D^u$ | $D_{ao}/D_c$ | $D_{au}$ mm | $D_{au}/D_u$ | $D_{au}/D_c$ |
|---|---|---|---|---|---|---|---|
| \multicolumn{8}{|l|}{Data on Air Core Diameters} |
| \multicolumn{8}{|l|}{$D_c$ = 80 mm, p = 1.2 atm., cone angle = 20°, Fluid = water} |
| 48 | 25 | 33.6 | 1.344 | 0.420 | 26.0 | 1.040 | 0.325 |
| 48 | 8 | 27.2 | 3.400 | 0.340 | 20.4 | 2.550 | 0.255 |
| 40 | 25 | 28.1 | 1.124 | 0.351 | 26.4 | 1.056 | 0.330 |
| 40 | 4 | 25.8 | 6.450 | 0.323 | 24.2 | 6.050 | 9.302 |
| 35 | 25 | 25.2 | 1.008 | 0.315 | 25.2 | 1.008 | 0.318 |
| 35 | 4 | 20.9 | 5.225 | 0.261 | 20.1 | 5.025 | 0.251 |
| 25 | 25 | 15.0 | 0.600 | 0.188 | 15.0 | 0.600 | 0.187 |
| 25 | 10 | 14.8 | 1.480 | 0.185 | 14.8 | 1.480 | 0.185 |
| 15 | 20 | 11.8 | 0.590 | 0.148 | 11.8 | 0.590 | 0.147 |
| 15 | 4 | 8.0 | 2.000 | 0.100 | 8.0 | 2.000 | 0.100 |
| 10 | 10 | 5.6 | 0.560 | 0.070 | 5.6 | 0.560 | 0.070 |
| 10 | 4 | 4.8 | 1.200 | 0.060 | 4.8 | 1.200 | 0.060 |

$D_c$ = Cyclone diameter
$D_o$ = Overflow (vortex finder) diameter
$D_u$ = Underflow diameter
$D_{ao}$ = Air core diameter at the overflow
$D_{au}$ = Air core diameter at the underflow
Note: No mention is made of $D_i$ or inlet water flowrate or the split of water between overflow and underflow.

The underflow diameter ($D_u$) was determined by considering the available data on air-core diameter mainly because of the requirement that there should be no underflow. This requirement can be achieved only when the air-core diameter exceeds the apex (or underflow) diameter. This implies that the core diameter must be estimated prior to determining the underflow diameter. Such an estimation was attempted making use of the data reported by Tarjan, Supra, which is reproduced here as Table 4.1.

From this table of results it may be concluded that the core diameter varies between 0.06 $D_c$ and 0.42 $D_c$. The above variation is due to changes in $D_o$ and $D_u$. These results yield the ratio of core diameter to the underflow diameter ($D_{ao}/D_u$) ranging from 0.50 to 6.5 for various combinations of $D_o$ and $D_u$. The maximum ratio of 6.5 resulted when $D_o/D_u=10.0$. For a 78 mm hydrocyclone, this means that $D_u$ should be 4.6 mm, 5.3 mm and 6.1 mm when $D_o$ is chosen as equal to 0.60 $D_c$, 0.70 $D_c$ and 0.80 $D_c$ respectively.

Such small underflow diameters are obviously not suitable in the present application because of the necessity of attaching a gas burner at the underflow. Therefore, a different criterion had to be selected for determining $D_u$. Such a criterion is that the maximum core diameter ($D_{ao}$) of 0.42 $D_c$ results when $D_u/D_o=0.52$. For these conditions $D_{au}/D_u=1.04$ which indicates that the core diameter at the apex was slightly larger than $D_u$, thereby reducing the underflow to zero. Based on this set of data, $D_u$ was estimated to be about 31.8 mm for $D_o=61$ mm. A diameter of 32 mm was then assigned to $D_u$. It should be noted that for set 5 in Table 4.1, $D_{au}/D_u$ was 1.008 and $D_u/D_o=0.7143$. This criterion would yield a value as high as 43.6 mm for $D_u$ which implies that $D_u$ can be varied within the range 32 to 44 mm without affecting the no-underflow condition.

It has been customary to construct cyclones with a cylindrical section and a conical section. This has arisen largely due to ease of construction giving the split, flanged components. The change in body section is regarded in some quarters as an undesirable feature and one-piece cyclones are being made without a cylindrical section. In addition to the ease of manufacture, the cylindrical section offers another advantage in the present application. Increase in overall length, either through increase in the length of the cylindrical section or through decrease in the cone angle, gives an increase in its capacity. Thus inclusion of a flanged cylindrical section would enable to easily achieve capacity changes as desired without affecting vortex stability. This has dictated the use of a cylindrical section in the present design. A value of 88 mm (1.1 $D_c$) was assigned for the length of the cylindrical section as it falls within the normal range of 0.67 to 2.0 Dc.

Cone angles normally used vary from 9° to 30° for the apex angle. However, it has been reported that larger cone angles create greater impetus to the reversal of flow as well as larger core diameters. Since both effects are desirable in the present invention larger cone angles appear to be of obvious choice. However, very large angles would create sudden changes in flow cross section which may cause destruction of the normal flow pattern and hence vortex stability. Therefore, a cone angle of 60° was assigned for the demonstration hydrocyclone.

In order for the proposed method of combustion in a stream of water to be successful, a stable flame should be maintained in the axial air-core of the hydrocyclone. This can be achieved by the use of a suitable gas burner attached to the hydrocyclone underflow.

Criteria for Design of the Burner

Requirements of a burner for use in the invention are that the firing port diameter should not be larger than the underflow diameter of the hydrocyclone (so that no part of the flame impinges on solid wall), the flame should be stable for varying water loads, and the flame stability limits should be wide enough to provide successful operation at different airfuel loadings and high turndown ratios for the gas flow rate.

Of the five categories of gas burners namely:
(1) Diffusion Flame Burners
(2) Atmospheric Burners
(3) Air-blast burners (in which the air supply entrains gas in an injector and a gas-air mixture is delivered to the burner head)
(4) Nozzle Mixing Air-blast Burners (in which turbulent mixing takes place at the burner head)
(5) Machine-Premix Burner Systems an air-blast burner of the premix type was chosen as providing a compact flame minimizing the combustion space requirements. Such burners have the following features:

1. High mixture pressures are obtained using modest air supply pressures resulting in high turndown ratios.
2. High burner port loadings may be obtained.
3. Air-gas mixing is good, minimizing flame length and combustion space requirements.
4. Interchangeability of fuel gases can be easily accomplished.

A further means for stabilizing the flame is by means of introducing swirl in the flow. A swirl burner includes angle vanes within the nozzle which impart a vortex flow within the air-gas mixture as it enters the combustion zone. Swirl may also be created through use of a cyclone burner. While not incorporated in the demonstration model, swirl stabilization of the flame is suitable for use with the invention.

The burner duty (or firing rate) can be determined easily as being equal to the sensible heat gain of the design flow rate of water when its temperature is raised by the desired increment. The critical mass flow of water corresponding to the various design dimensions of the hydrocyclone was calculated to be about 650 kg/h. In order to ensure vortex stability the operating flow rate of water should be in excess of the critical flow. For a turndown ratio of 2.0 the operating water flow is about 1300 kg/h. The temperature of the hot water in many industrial processes is normally in the range of 60°14 70° C. This requires that the increase in the water temperature is between 50°–60° C. assuming a cold water temperature of 10° C. The burner heat duty can thus be calculated to be about 90 kW which is equal to the sensible heat gain of 1300 kg/h of water in raising its temperature by 60° C. The gas burner was designed for a heat duty of about 100 kW (350,000 Btu/h).

The burner port diameter can then be calculated for a stoichiometric methane-air mixture to be about 30 mm from the burner capacity equation from the "Gas Engineer's Handbook—Fuel Gas Engineering Practices", Industrial Press Inc. N.Y., 1974. This matches closely with the hydrocyclone underflow diameter of 32 mm. Hence the burner port diameter was assigned a value of 32 mm. This results in combustion mixture velocities of about 50 m/s at design heat delivery and using methane as the fuel gas. Such high velocities of unburned mixture, although quite common in industrial burners, necessitate the use of reliable flame retention (stabilization) technique to prevent flame lifting or blowoff.

A half-cylinder bluff body placed with its axis perpendicular to the direction of combustion mixture flow with the flat side facing downstream was used as an auxiliary flame retention means.

In order to ignite the high velocity stream of combustible mixture it was decided to make use of a flame retention cup. The main stream of air-gas mixture exiting as a jet from the main port creates a low pressure region in the flame retention cup. This enables the combustion mixture to be drawn through the auxiliary ports at low velocity into the cup, thus providing a low velocity combustible mixture stream for easy ignition by means of a spark igniter. This results in a slow burning auxiliary annular flame at the base of the main flame. This auxiliary flame serves as a continuous source of ignition of the main jet. Thus the flame retention cup serves not only as a means of ignition but also as a secondary flame holder.

Due to the low velocity combustion taking place within the tip, the flame retention cup heats up. To prevent the overheating of the cup it was necessary to provide a cooling jacket around it. The hydrocyclone inlet water stream itself was used as the cooling medium.

Criteria for the Design of the Extended Heat Transfer/Contact Zone

The need for an extended zone for transfer of heat from the hot combustion products to the water stream arises from the fact that the residence time of water in the hydrocyclone is very small, in the range of 1–3 seconds. Very large heat transfer coefficients would be required in order for the water temperature to rise significantly in such short residence times. In order to recover the heat content of the products of combustion a two-phase flow contact section was provided.

The preferred flow regime in this section is of annular mist flow pattern with large liquid entrainment for high degree of heat transfer to occur. A method for predicting when an annular mist flow pattern occurs is to use the flow map of Mandhane et al appearing in "A Flow Pattern Map for Gas-Liquid Flow in Horizontal Pipes" International Journal of Multiple Flow 1, P537, 1974 reproduced in the paper by Taitel and Dukler cited earlier. Only the liquid and gas superficial velocities are needed to determine the two-phase flow pattern from this map.

In annular-mist flow the pipe wall is covered with a thin liquid film (the film is thicker at the bottom than at the top due to gravity) and the central gas core contains fine droplets of liquid as entrainment. A good treatment of annular two-phase flow and heat transfer can be found in the book by Hewitt and Hall-Taylor, "Annular Two-Phase Flow" Pergamon Press N.Y. 1970.

Annular mist flow pattern occurs at large superficial gas velocities ($V_{sj}$). Where possible a lower value of gas superficial velocity is preferred due to the increased residence time of the combustion products in the system. A value of 0.152 m/s which is in the middle of the desired superficial liquid velocity ($V_{sl}$) range, as determined from the flow map, was selected. The cross sectional area required to obtain this velocity at design water flow rate of 1300 kg/h was calculated to be 23.7 cm$^2$ corresponding to a diameter of 5.493 cm. The nearest standard pipe (2 inch nominal—schedule 10S—SS pipe) with an inside diameter of 5.479 cm was chosen for the purpose.

The actual superficial velocities at design flow rate of water and that of unburned cold combustion mixture were calculated to be 0.15 m/s and 13.35 m/s respectively. It should be noted that the calculated $V_{sg}$ was based on the cold combustion mixture flow which was assumed to have a temperature of 25° C. The actual temperature of the combustion gas stream as it enters the two-phase flow section should always be above 25° C. Assuming a combustion gas temperature as low as 65° C. (which was observed to be a typical value of the exhaust gas temperature in the preliminary experiments) would yield a value of 15.15 m/s for $V_{sg}$ which is above the minimum $V_{sg}$ required for establishment of desired annular mist flow.

It is well known that the thickness of the liquid film adjacent to the pipe walls is not uniform in horizontal annular mist flow. Due to the action of gravity the film thickness at the bottom of the pipe cross section is larger than that at the top. In order to reduce the possibility that at certain distance along the flow path the top section of the pipe wall may become deprived of the liquid film transverse baffles were placed in the bottom part of the pipe so that the entrainment of water into the gas core is further aided.

The inclination of the pipe has pronounced effects on the boundaries between the various flow regimes of horizontal two-phase flow. Downward inclination of even 1° causes stratified flows to occur over wide range of $V_{sl}$ whereas upward inclination of 1° results in complete elimination of stratified flows. Also, with an upward inclination of 1° the annular mist flow pattern can be observed at as low $V_{sg}$ as 6.1 m/s when $V_{sl}$ values exceed 0.2 m/s. In order to provide this added advantage the two-phase flow section was set up with a slight upward angle (1.2°).

Other System Components

The gas-liquid separator was designed according to standard techniques. A 5.0 mm thick demister pad was provided for minimizing water entrainment in the exhaust gas.

Air at a pressure of about 700 kPa was sent to the burner through an air filter and valves. Methane was supplied from a system of six compressed gas cylinders. The high pressure of the gas was reduced through a two-stage pressure regulator from where it was sent to the burner through a flame arrestor, gas filter, and a series of valves.

System Operation

Figure 6:
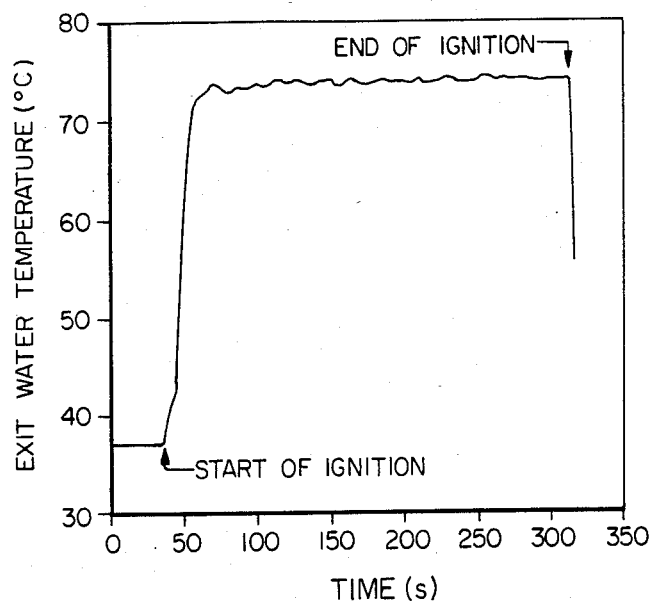

The system was turned on first by opening the air and water flows at stable rates then the igniter was turned on and the flow of gas was commenced. When adjusted to the desired equivalence ratio, a steady state output temperature would be reached within about 30 seconds. FIG. 6 shows the trace for temperature as a function of time on start up.

Figure 7:
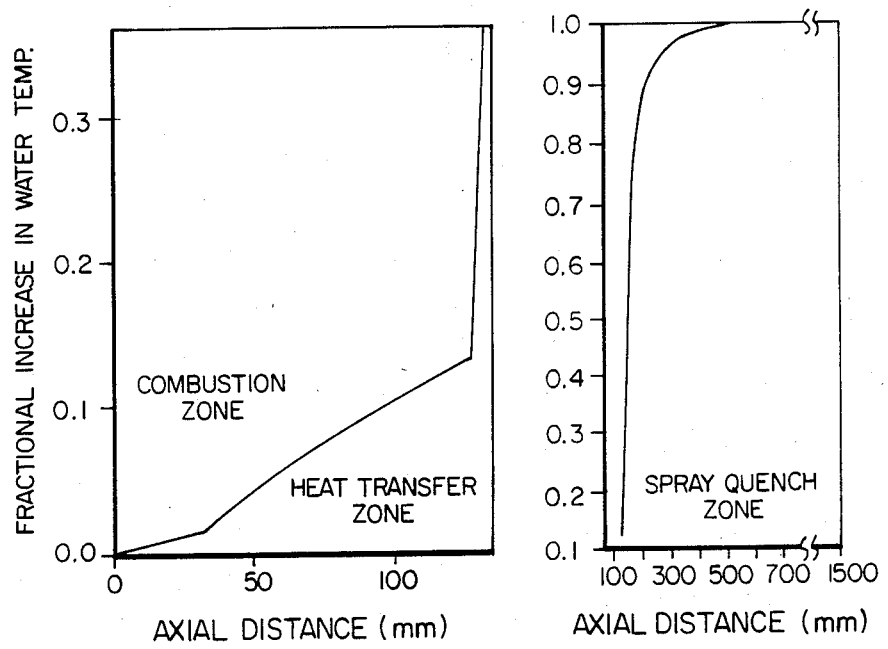
FIG. 7 shows graphically the degree of heat transfer occurring in the different zones.
Figure 8:
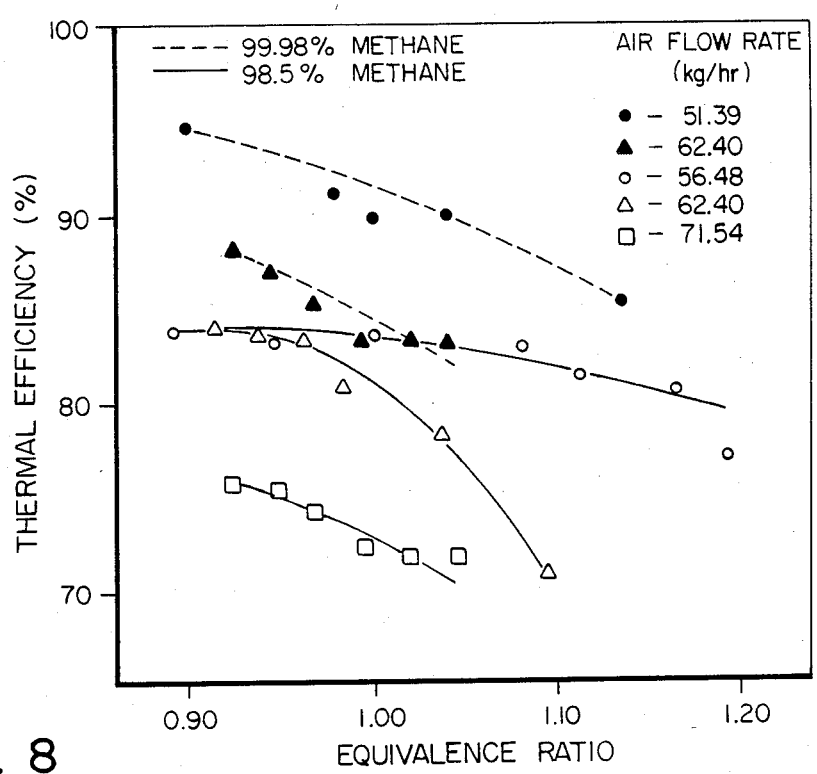
FIG. 8 shows graphically thermal performance as a function of variations in equivalence ratio and air flow rates.
Figure 9:
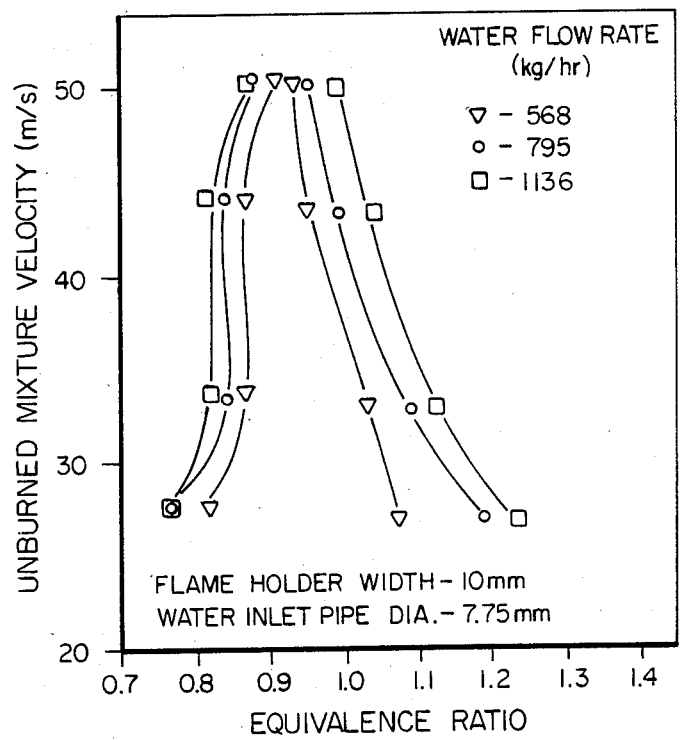
FIG. 9 shows graphically the limits of flame stability for varying water flow rates and equivalence ratios.

Measurements and calculations were made to determine the zones within which heat transfer was occurring. FIG. 7 shows graphically the theoretical degree of heat transfer occurring in the various zones proceeding from the burner towards the separator.

Figure 14:
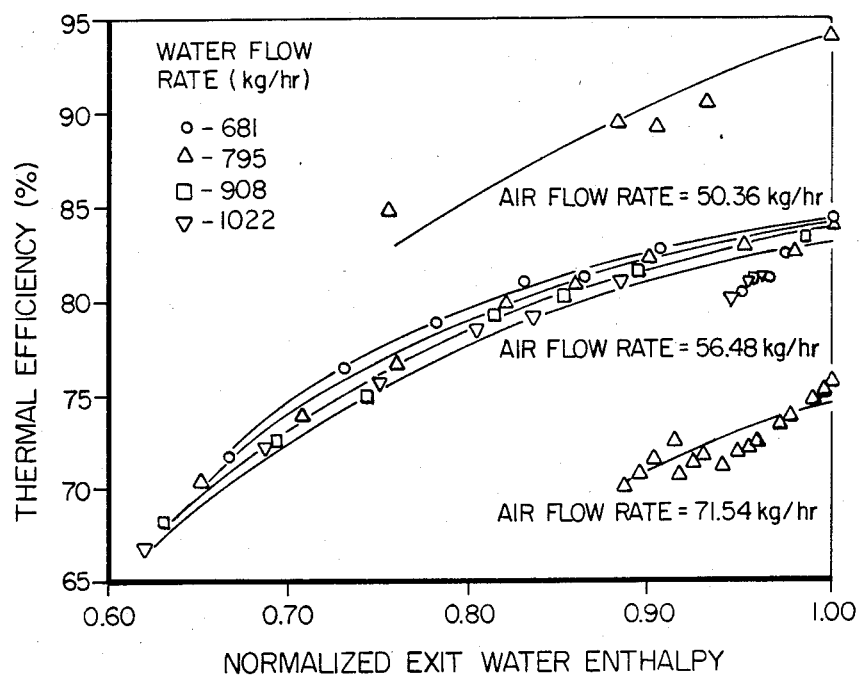
FIG. 14 shows graphically thermal efficiency as a function of normalized exit water enthalpy for different air and water flow rates.

Variation of thermal efficiency for differing air and water flow rates as a function of the normalized exit water enthalpy, (defined as the ratio of exit water enthalpy to the maximum exit water enthalpy at the given air flow rate) are shown in FIG. 14.

Thermal efficiency is defined here as the ratio of the sensible heat gain of the water stream to the total heat generated by combustion.

Figure 10:
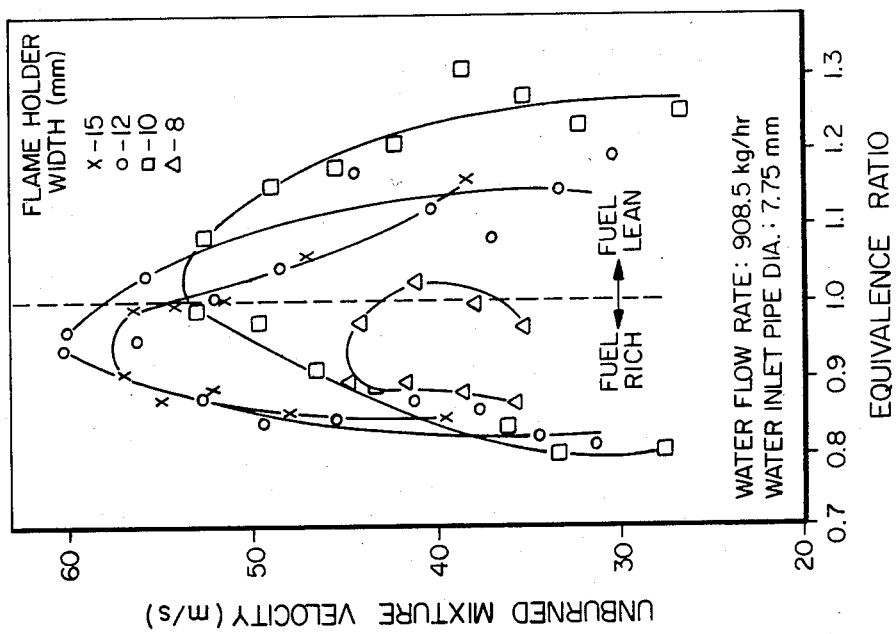
FIG. 10 shows graphically the limits of flame stability for varying flame holder widths and equivalence ratios.

The effects on flame stability of inlet water flow rates and of flame holder width for differing equivalence ratios is shown in FIGS. 7 and 10. Equivalence ratio means actual air-fuel ratio divided by the stoichiometric air-fuel ratio. In both cases the equivalence ratio was varied slowly until the flame was extinguished. The boundary values for the operating conditions were then recorded. Successful operation of the system entails maintenance of these conditions between the upper and lower boundaries at which extinguishment occurs.

Figure 11:
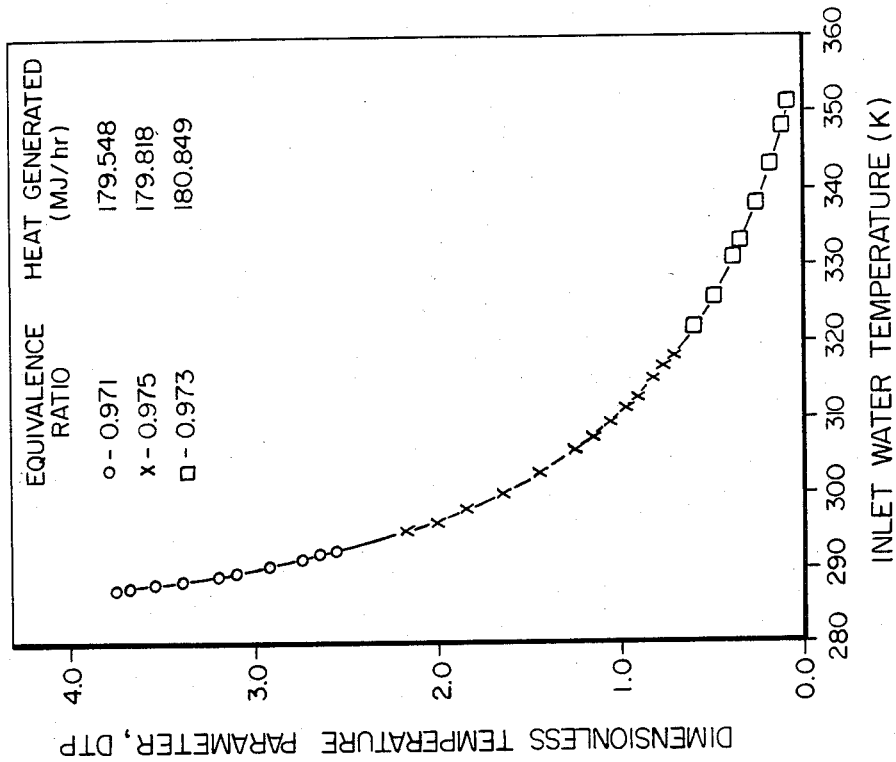
FIG. 11 shows graphically the variation of the dimensionless temperature parameter (DTP) with variations in water inlet temperature.

The effect of increasing water inlet temperature on the dimensionless temperature parameter DTP, defined as the ratio of temperature difference between the exit water and inlet water to the inlet water temperature, is shown in FIG. 11. As the inlet water temperature is increased the transfer of enthalpy to the water is increasingly in the form of conversion of the water to steam and less in the form of increasing its temperature. Steam may also be created by operating the system under pressure so as to produce syperheated water which may be flashed to release steam upon reduction of the pressure.

Figure 12:
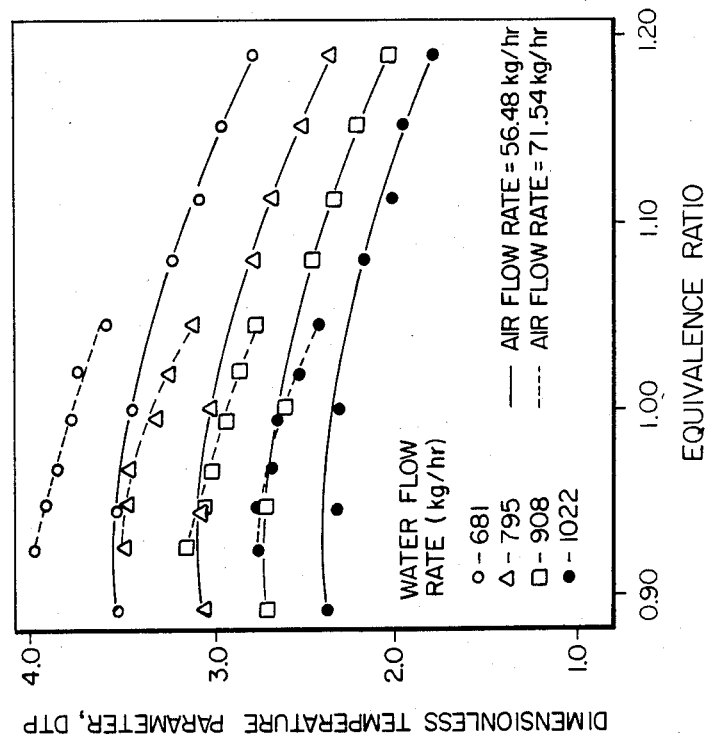
FIG. 12 shows graphically variation in the DTP with equivalence ratio for different air and water flow rates.

The effects of the flow rates of air, gas and water on DTP are shown in FIG. 12. It can be seen that larger increases in water temperature are obtained at high air flow rates for any given equivalence ratio. A trend of decreasing DTP with increasing equivalence ratio with all the curves in FIG. 12 can also be observed. Higher increases in water temperature are achieved at lower water flow rates.

Figure 13:
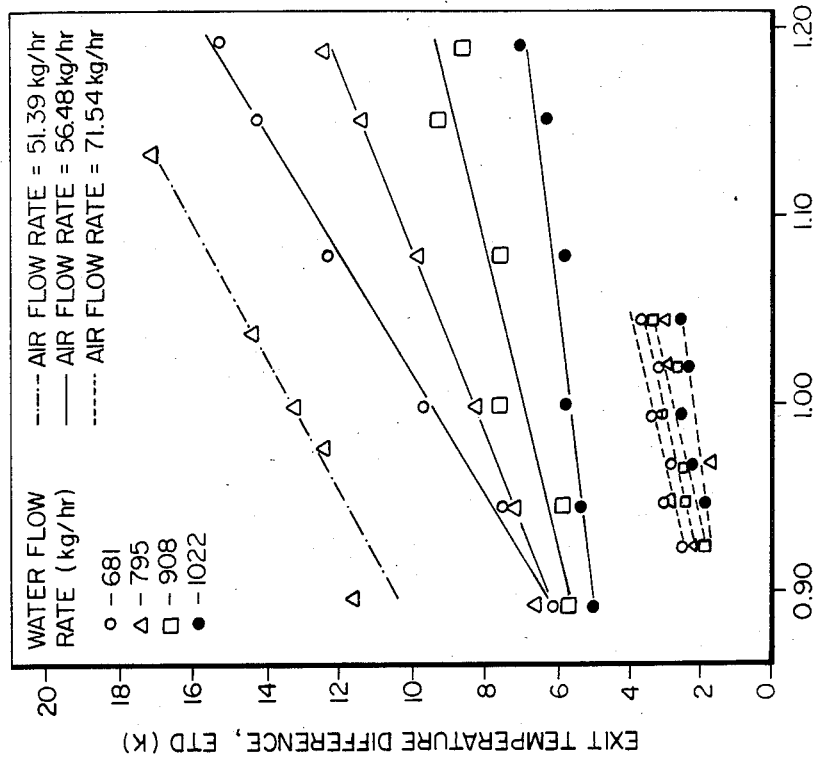
FIG. 13 shows graphically variations in the exit temperature difference (ETD) with equivalence ratio for different air and water flow rates.

The effect of flow rates of air, gas and water on exit temperature difference, ETD (defined as the difference between the exhaust gas and exit water temperatures) is shown in FIG. 13. A general trend of increasing ETD with increasing equivalance ratio can be observed. It can also be seen that ETD at any given equivalence ratio increases with decreasing air flow rate. The four solid curves, in the middle of this figure, corresponding to different water flow rates, indicate a trend of increasing ETD with decreasing water flow rates.

The difference between the exhaust gas temperature and the exit water temperature can be as low as 2° C. This indicates that conditions close to heat transfer equilibrium can be achieved in this process. In terms of compactness, the invention can have much higher overall volumetric heat transfer coefficients, with values 3 to 14 times those of conventional DCHT systems. Compared to a modern oil fired shell and tube boiler combustion intensity ratios of several thousands can be obtained.

The foregoing description sets forth one example of the application of the invention. The scope of the invention in its most general sense, and the methods and apparatus in which an exclusive right is claimed are set forth in the claims which follow.

What is claimed is:

1. A method for contacting a liquid with a gas comprising the steps of:
   (a) continuously injecting said liquid through an inlet pipe into a hollow container and forming along the interior surface of said container a continuous, inertially rotating liquid vortex flow having a substantially liquid free core within said container; and
   (b) passing a gas through said vortex core, whereby said gas contacts the inner surface of said liquid along said vortex core;
wherein said gas originates from a combustible mexture which is introduced into and is ignited to produce a flame within said vortex core said flame being substantially surrounded by, and in direct contact with, said rotating liquid.

2. A method for contacting a liquid with a gas comprising the steps of:
   (a) continuously injecting said liquid through an inlet means into a hollow container and forming along the interior surface of said container a continuous inertially rotating reversing liquid vortex flow having inner and outer layers of spiralling liquid which layers are migrating in opposite directions, and having a substantially liquid free core within said container; and
   (b) passing a gas through said vortex core, whereby said gas contacts the inner surface of said liquid along said vortex core.

3. The method as defined in claim 2, said gas being hotter than said liquid.

4. The method as defined in claim 3, said gas being a combustion product.

5. The method as defined in claim 4, wherein said gas originates from a combustible mixture which is introduced into and is ignited to produce a flame within said vortex core.

6. The method as defined in claim 1, wherein said liquid passes from said vortex into an extended contact zone wherein said liquid is contacted with gas passing from said vortex core into said extended contact zone.

7. The method as defined in claim 2, wherein said liquid passes from said vortex into an extended contact zone wherein said liquid is contacted with gas passing from said vortex core into said extended contact zone.

8. The method as defined in claim 6, wherein said extended contact zone comprises a substantially cylindrical container having an internal circumferential surface around which said liquid is distributed in a generally annular flow pattern.

9. The method as defined in claim 7, wherein said extended contact zone comprises a substantially cylindrical container having an internal circumferential surface around which said liquid is distributed in a generally annular flow pattern.

10. The method as defined in claim 8 in which at least a portion of said liquid becomes entrained in the gas through the effect of annular misting.

11. The method as defined in claim 9 in which at least a portion of said liquid becomes entrained in the gas through the effect of annular misting.

12. The method as defined in claim 2, 7 or 9 wherein a chemical, physical or mass-transfer process occurs between said liquid and gas upon contact therebetween.

13. The method as defined in claims 10 or 11 wherein a chemical, physical or mass-transfer process occurs between said liquid and gas upon contact therebetween.

14. The method as in claim 2 wherein said container is a cylinder of circular cross-section with flow reversing means at one end thereof and the average injection velocity of said liquid at said inlet means conforms with the following formula:

$$V_i > 0.27 \text{ g } 0.5^{R_c} 1.5/R_i$$

where
   $V_i$ = average velocity of water in the inlet pipe
   g = acceleration due to gravity
   $R_c$ = radius of cylindrical portion of cyclone
   $R_i$ = radius of inlet pipe.

15. An apparatus for contacting a gas with a liquid comprising:
   (1) a vortex container with first and second ends, having an axial core and having:
      (a) a liquid inlet mounted through the wall of said container said liquid inlet being adapted to tangentially inject liquid into said container and create a first spiralling flow of said liquid therein, said first spiralling flow having an inner boundary;
      (b) a vortex-substaining inner surface adapted to receive liquid injected from said inlet, said surface defining a vortex chamber which is axially aligned within said container;
      (c) an inwardly angled liquid flow reversing means mounted towards said first end of said vortex container and adapted to create a reversed spiralling liquid flow along the inner boundary of said first spiralling flow;
   (2) an outlet at the second end of said container along its axis being adapted to receive a flow of liquid and gas exiting from said vortex chamber;
   (3) a gas flow aperture at said end of said container adapted to be coupled to a source of gas and to receive the injection of a gas flow into said container along its axial core.

16. An apparatus as described in claim 15 wherein the dimensions of said container, injection inlet and gas flow aperture are selected so that a given liquid injected at a predetermined rate through said inlet forms a vortex with a liquid-free axial core of a diameter equal to or greater than that of said aperture.

17. An apparatus as described in claim 15 wherein said inwardly angled flow reversing means constitutes an annular end surface to said container, with said gas flow aperture being formed within said annular end surface.

18. An apparatus as described in claim 15 having attached at the outlet of said vortex container, a container defining a mixing zone wherein gas and liquid passing through said vortex container may be brought into further contact with each other.

19. An apparatus as described in claim 18 wherein said mixing container is adapted to create a condition of annular mist flow when liquid and gas flows exiting from said vortex container pass within said mixing container.

20. An apparatus as described in claims 15, 16 or 17 having a burner nozzle mounted at said first end of said container whereby a flame may be deployed within said vortex chamber.

21. An apparatus as described in claims 18 and 19 and having a burner nozzle mounted at said first end of said container whereby a flame may be deployed within said vortex chamber.

22. An apparatus as described in claims 15, 16 or 19 wherein said container is a cylinder of circular cross-section with flow reversing means at one end thereof in which the ratio of the diameter of said outlet to said container exceeds 0.65.

23. An apparatus as described in claims 15, 16 or 19 wherein said container is a cylinder of circular cross-section with flow reversing means at one end thereof in which the ratio of the diameter of said container to said outlet exceeds 0.70.

24. An apparatus as described in claims 15, 16 or 17 wherein:
 (1) said vortex chamber is cylindrical;
 (2) said outlet is comprised of a cylindrical outlet tube, one end of which extends axially into said vortex chamber past said inlet in the direction towards said gas flow aperture;
 (3) said outlet tube being of a diameter less than the diameter of said vortex chamber by at least twice the amount of the maximum diameter of said inlet.

25. An apparatus as described in claims 15, 16 or 17 wherein said container has a flame deployed within said vortex chamber and a flow of water passing though said container and said container is installed down a borehole.

26. An apparatus for contacting a gas with a liquid comprising:
 (1) a vortex container with first and second ends, having an axial core and having:
  (a) a liquid inlet mounted through the wall of said container said liquid inlet being adapted to tangentially inject liquid into said container and create a spiralling flow of said liquid therein;
  (b) a vortex-sustaining inner surface adapted to receive liquid injected from said inlet, said surface defining a vortex chamber which is axially aligned within said container;
 (2) an outlet at the second end of said container along its axis being adapted to receive a flow of liquid and gas exiting from said vortex chamber;
 (3) a gas flow aperture at said first end of said container adapted to receive the injection of a gas flow into said container along its axial core,
and having a burner nozzle mounted at said first end of said container whereby a flame may be deployed within said vortex chamber.

27. An apparatus as described in claim 26 having attached at the outlet of said vortex container, an extended container defining a mixing zone wherein gas and liquid passing through said vortex container may be brought into further contact with each other.

28. An apparatus as described in claim 27 wherein said extended container is adapted to create a condition of annular mist flow when liquid and gas flows exiting from said vortex container pass within said mixing container.

29. The method as defined in claims 1, 6 or 10 in which the liquid is water and the gas is natural gas.

* * * * *